No. 687,571.  
J. ONIONS.  
MILL FOR POWDERING MARLS, BONES, CEMENT, &c.  
(Application filed Feb. 25, 1899.)  
(No Model.)  
Patented Nov. 26, 1901.  
3 Sheets—Sheet 1.

Witnesses  
W. J. Guest  
E. Le Cousins

Inventor  
Jo. Onions  
by Cornelius  
his attorney

No. 687,571. Patented Nov. 26, 1901.
J. ONIONS.
MILL FOR POWDERING MARLS, BONES, CEMENT, &c.
(Application filed Feb. 25, 1899.)

(No Model.) 3 Sheets—Sheet 2.

FIG. 2

No. 687,571. Patented Nov. 26, 1901.
J. ONIONS.
MILL FOR POWDERING MARLS, BONES, CEMENT, &c.
(Application filed Feb. 25, 1899.)

(No Model.) 3 Sheets—Sheet 3.

Witnesses Inventor

UNITED STATES PATENT OFFICE.

JOSEPH ONIONS, OF WOLVERHAMPTON, ENGLAND.

MILL FOR POWDERING MARLS, BONES, CEMENT, &c.

SPECIFICATION forming part of Letters Patent No. 687,571, dated November 26, 1901.

Application filed February 25, 1899. Serial No. 706,897. (No model.)

*To all whom it may concern:*

Be it known that I, JOSEPH ONIONS, brick manufacturer, a subject of the Queen of Great Britain, and a resident of Wolverhampton, in the county of Stafford, England, have invented new and useful Improvements in Edge-Runner Grinding-Mills, (for which I have applied for a patent in Great Britain, No. 18,910, dated September 5, 1898,) of which the following is a specification.

My invention has for its object an improved edge-runner grinding-mill for grinding or powdering marl, bones, cement, slags, &c., by which the clay or other material is more thoroughly and quickly ground and separated than heretofore, while a considerable amount of labor is saved by the arrangement of the pans, hopper, and elevator.

In order that my invention may be clearly understood and more easily carried into practice, I have appended three sheets of drawings, upon which I have fully illustrated my said improvements.

Figure 1:
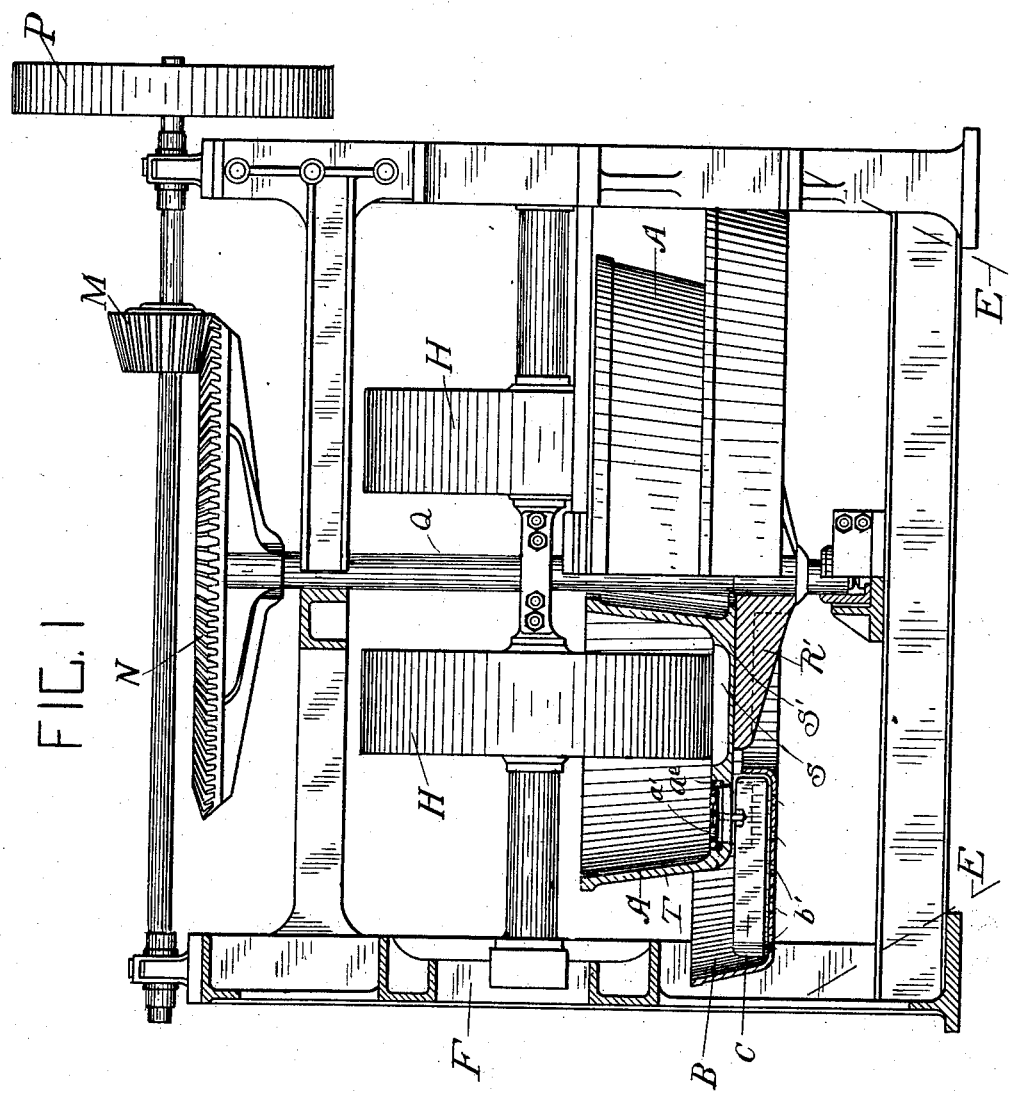
Figure 3:
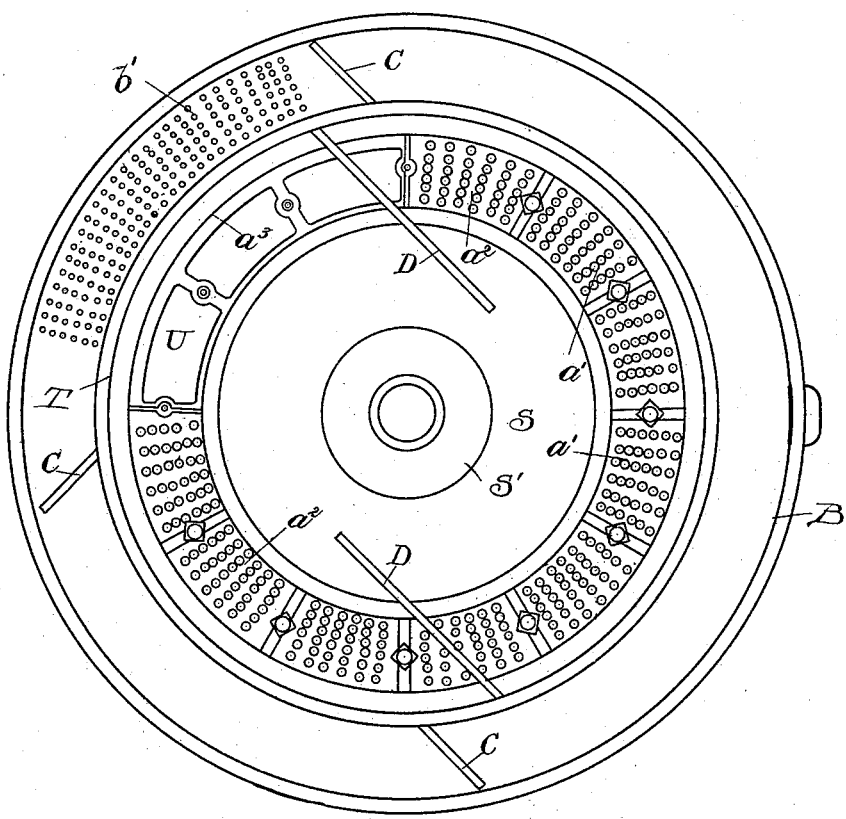

Figure 1 is a part front elevation and part section of one of my mills. Fig. 2 is a side elevation. Fig. 3 is a plan view of the pans.

In carrying my invention into effect I provide two pans A and B, the one A being mounted to revolve by means of the gear-wheels M and N and pulley P and which is provided with the perforations $a'$, which are formed in the plates $a^2$, several of which are removed in Fig. 3 to show the underframing $a^3$ of the pan. The pan B is stationarily fixed upon the support $f'$ of the frame F and is provided with the perforations $b'$, which are finer than those of the pan A, which is revoluble with the vertical shaft Q, as it is supported by the supporting-disk R', carried by the shaft. Stationary scrapers D are provided in the pan A for directing the clay onto the ring-die S, countersunk in the ring S', said ring-die forming the path for the rollers H. For scraping the clay over the perforations $b'$ I employ the traveling scrapers C, which are attached to the under side of the pan A, the coarser material being directed to the apertures $b^2$, from whence it drops into the trough K and is conveyed by the elevator R back to the grinding-pan A. Perforations $a'$ are provided in the bottom of the pan A for receiving and allowing the clay to drop into the pan B. The fine clay after passing through the perforations of the pan B drops into the hopper indicated by the dotted lines E, from whence it is brought up for use by suitable elevators. The ring S is connected to the peripheral curb or wall T by means of the arms U.

The action is as follows: The material to be ground is fed into the pan A and after being sufficiently crushed by the rollers H is scraped through the holes $a'$ by the scrapers D, thus falling into the pan B, where it is scraped over the smaller perforations $b'$, so that the fine portion passes through the said perforations and drops into the hopper E in a finished state, while the rougher portions are gradually pressed through the aperture $b''$ and from thence are conveyed back to the pan A.

What I claim is—

The combination of a frame, grinding or crushing rollers revolubly mounted in said frame, a revoluble vertical shaft, a supporting-disk secured to and revoluble with said vertical shaft, a pan secured to said disk upon which the rollers rest and relatively travel, said pan comprising an inner grooved imperforate ring, a ring-die countersunk in said ring in the path of said rollers, a peripheral curb or wall, arms connected with the inner ring and supporting said curb and leaving openings, an annular screen countersunk in the pan-bottom over said openings, sweeps or scrapers secured to the under side of the pan, and a stationary auxiliary pan mounted below the primary pan, and having a more finely perforated bottom, said scrapers being arranged to sweep the bottom of the auxiliary pan.

In testimony whereof I have signed my name to this specification in the presence of two subscribing witnesses.

JOSEPH ONIONS.

Witnesses:
 WALTER H. E. BARTLAM,
 LEWIS WM. GOOLD.